US008843560B2

(12) United States Patent
Hayashi et al.

(10) Patent No.: US 8,843,560 B2
(45) Date of Patent: Sep. 23, 2014

(54) SOCIAL NETWORKING FOR MOBILE DEVICES

(75) Inventors: Nathanael Joe Hayashi, Piedmont, CA (US); E. Stanley Ott, IV, Palo Alto, CA (US); Audrey Y. Tsang, San Francisco, CA (US); Matthew Fukuda, San Francisco, CA (US); Dan Wascovich, San Francisco, CA (US); Michael Quoc, San Francisco, CA (US); Russell Beattie, Menlo Park, CA (US)

(73) Assignee: Yahoo! Inc., Sunnyvale, CA (US)

(*) Notice: Subject to any disclaimer, the term of this patent is extended or adjusted under 35 U.S.C. 154(b) by 1015 days.

(21) Appl. No.: 11/380,874

(22) Filed: Apr. 28, 2006

(65) Prior Publication Data

US 2007/0255807 A1    Nov. 1, 2007

(51) Int. Cl.
*G06F 15/16*     (2006.01)
*H04L 12/58*     (2006.01)
*H04L 29/08*     (2006.01)
*H04W 4/20*      (2009.01)
*G06F 17/30*     (2006.01)
*H04W 4/02*      (2009.01)

(52) U.S. Cl.
CPC ........ *H04L 67/306* (2013.01); *G06F 17/30017* (2013.01); *H04L 12/58* (2013.01); *H04W 4/02* (2013.01); *H04W 4/206* (2013.01); *H04L 12/581* (2013.01); *H04L 67/22* (2013.01); *H04L 51/04* (2013.01)
USPC ....................................................... 709/205

(58) Field of Classification Search
CPC ... H04L 67/306; H04L 67/22; H04L 67/1646; H04W 4/206; H04W 4/02; G06F 17/30017

USPC .................. 709/204–205; 701/200, 207, 213; 455/403, 414.1–414.3
See application file for complete search history.

(56) References Cited

U.S. PATENT DOCUMENTS

| | | | |
|---|---|---|---|
| 5,835,087 A | 11/1998 | Herz et al. |
| 5,950,193 A | 9/1999 | Kulkarni |
| 5,996,006 A | 11/1999 | Speicher |
| 6,029,141 A | 2/2000 | Bezos et al. |

(Continued)

OTHER PUBLICATIONS

ImaHima Mobile Community [retreived online on Dec. 22, 2008] Oct. 18, 2006 [Retreived fro the Internet] <URL: http://www.imahima.com/ihcorpv3/portfolio/imahima.html>.*

(Continued)

*Primary Examiner* — Larry Donaghue
(74) *Attorney, Agent, or Firm* — James J. DeCarlo; Greenberg Traurig, LLP

(57) ABSTRACT

A mobile device, system, and method are directed towards enabling an integrated display of live views. The integrated live views are generated by employing social networking information, including moods of a person, avatars, status of a member's activities including whether they are in an IM session, or the like. Integrated live views may include a live contact list, a group view, a friend view, an activity oriented view, a list of content, or the like, based on the mobile user's social networking information. By providing the mobile user with integrated live views of their social network, the mobile user may be able communicate with other members within the mobile social networking context, to obtain, and respond to invites from a social network member, provide opportunities for activities to other members, to grow their social network, and to consume content that is displayed relative to their social network.

20 Claims, 9 Drawing Sheets

(56) References Cited

U.S. PATENT DOCUMENTS

| | | | |
|---|---|---|---|
| 6,175,831 B1 | 1/2001 | Weinreich et al. | |
| 6,269,369 B1 | 7/2001 | Robertson | |
| 6,327,573 B1 | 12/2001 | Walker et al. | |
| 6,343,317 B1 | 1/2002 | Glorikian | |
| 6,356,879 B2 | 3/2002 | Aggarwal et al. | |
| 6,433,795 B1 | 8/2002 | MacNaughton et al. | |
| 6,449,344 B1 | 9/2002 | Goldfinger et al. | |
| 6,466,917 B1 | 10/2002 | Goyal et al. | |
| 6,529,724 B1* | 3/2003 | Khazaka et al. | 455/405 |
| 6,606,657 B1 | 8/2003 | Zilberstein et al. | |
| 6,714,931 B1 | 3/2004 | Papierniak et al. | |
| 6,745,178 B1 | 6/2004 | Emens et al. | |
| 6,879,994 B1 | 4/2005 | Matsliach et al. | |
| 7,284,033 B2* | 10/2007 | Jhanji | 709/206 |
| 7,319,863 B2 | 1/2008 | Engstrom et al. | |
| 7,593,740 B2* | 9/2009 | Crowley et al. | 455/456.3 |
| 7,636,779 B2 | 12/2009 | Hayashi et al. | |
| 7,725,492 B2* | 5/2010 | Sittig et al. | 707/784 |
| 2002/0023132 A1 | 2/2002 | Tornabene et al. | |
| 2002/0023230 A1 | 2/2002 | Bolnick et al. | |
| 2002/0046259 A1 | 4/2002 | Glorikian | |
| 2002/0116466 A1 | 8/2002 | Trevithick et al. | |
| 2002/0124053 A1 | 9/2002 | Adams et al. | |
| 2003/0050977 A1 | 3/2003 | Puthenkulam et al. | |
| 2003/0065788 A1 | 4/2003 | Salomaki | |
| 2003/0167324 A1 | 9/2003 | Farnham et al. | |
| 2003/0200192 A1* | 10/2003 | Bell et al. | 707/1 |
| 2004/0088315 A1 | 5/2004 | Elder et al. | |
| 2004/0088322 A1 | 5/2004 | Elder et al. | |
| 2004/0088325 A1 | 5/2004 | Elder et al. | |
| 2004/0122681 A1 | 6/2004 | Ruvolo et al. | |
| 2004/0122803 A1 | 6/2004 | Dom et al. | |
| 2004/0122855 A1 | 6/2004 | Ruvolo et al. | |
| 2004/0162830 A1* | 8/2004 | Shirwadkar et al. | 707/10 |
| 2004/0162881 A1* | 8/2004 | Digate et al. | 709/206 |
| 2004/0215793 A1 | 10/2004 | Ryan et al. | |
| 2005/0174975 A1* | 8/2005 | Mgrdechian et al. | 370/338 |
| 2006/0074883 A1 | 4/2006 | Teevan et al. | |
| 2006/0229063 A1* | 10/2006 | Koch | 455/414.1 |
| 2006/0271620 A1* | 11/2006 | Beaty et al. | 709/203 |
| 2007/0033250 A1* | 2/2007 | Levin et al. | 709/204 |
| 2007/0150542 A1* | 6/2007 | Sommerer | 709/206 |
| 2007/0233875 A1 | 10/2007 | Raghav et al. | |
| 2008/0147420 A1 | 6/2008 | Rowan et al. | |
| 2009/0165090 A1 | 6/2009 | Glasgow | |
| 2011/0004634 A1* | 1/2011 | Stremel et al. | 707/802 |

OTHER PUBLICATIONS

ImaHima Simple Wireless Instant Messaging Platform (SWIM) Version 3.0 [retreived online on Dec. 22, 2008] Aug. 2, 2002 [Retreived from the Internet] <URL: http://web.archive.org/web/20020802195348/www.imahima.com/en/products_services.html>.*

Wired for Sex staff. "Japan: Wireless for Sex." [retreived online on Dec. 22, 2008] Original Airdate: Jun. 4, 2003 [Retreived from the Internet] <URL: http://www.g4tv.com/wiredforsex/features/44899/Japan_Wireless_for_Sex.html>.*

International Search Report and Written Opinion for International Application No. PCT/US07/66820, mailed on Jun. 13, 2008, 8 pgs.

"A Sneak Preview of the Christian Connection Matchmaker Match Page", http://web.archive.org/web/19990223221053/www.christian.matchmaker.com/ppmatch, Feb. 23, 1999.

"A Sneak Preview of the Christian Connection Matchmaker Search Page", http://web.archive.org/web/19990508232314/www.christian.matchmaker.com/ppsearch, May 8, 1999.

"The Purpose Principles and Process", http://web.archive.org/web/19990224045035/www.christian.matchmaker.com/process, Feb. 24, 1999.

"Welcome to the Christian Connection Matchmaker", http://web.archive.org/web/19990221092342/www.christian.matchmaker.com/main, Feb. 21, 1999.

"Yahoo! Groups—What is the spam policy in Yahoo! Groups? How do I avoid spam?", http://web.archive.org/web/20021024130230/help.yahoo.com/help/us/groups/groups-05.html, Oct. 24, 2002.

"Yahoo! Groups—What is a Group?", http://web.archive.org/web/20021103223155/www.yahoo.com/r/ub, Nov. 3, 2002.

"Yahoo! Groups—Getting Started, Groups Account, Groups Features", http://web.archive.org/web/20021017061719/http://help.yahoo.com/help/groups, Oct. 17, 2002.

Cranor, L. F. et al. "Spam," Communications of the ACM, 41(8):74-83, Aug. 1998.

Dragan, R. V., "Tribe.net (beta)," PC Magazine, http//:www.pcmag.com/article2/0,1759,1418688,00.asp, Jan. 20, 2004.

Hines, M., "America Online proposes Love.com," http://news.com.com/2100-1032-5118986.html, Dec. 10, 2003.

Hines, M., "AOL serves up software for BREW", http://news.com.com/2100-1038-5117686.html, Dec. 9, 2003.

Matchmaker.com Disclaimer, http://web.archive.org/web/20000420114350/www.Christian.matchmaker.com/rules, Apr. 20, 2000.

Member site Selection Page for Matchmaker.com, http://web.archive.org/web/19990219183131/matchmaker.com/newtry.shtml, Feb. 19, 1999.

Merrick, A., "The Best Way to . . . Find a Date—OK, so true love isn't guaranteed: But there are ways to better the odds", Wall Street Journal, New York, NY, p. R16, Nov. 27, 2000.

Mullaney, T. J., "Diller's Latest Little Bet on the Net", BusinessWeek Online, http://www.businessweek.com/print/technology/content/mar2004/tc20040431_2820_tc119.h . . . Mar. 1, 2004.

"Mobile Phone Technology Opens up New Revenue Streams," Zi Corporation White Paper, pp. 1-5, May 2005.

US Patent and Trademark Office, Office Communication mailed Sep. 28, 2009 in U.S. Appl. No. 12/140,217, 18 pages.

Office Communication mailed Apr. 2, 2010 for U.S. Appl. No. 12/140,217.

Office Communication mailed Jun. 1, 2010 for U.S. Appl. No. 12/140,217.

Office Communication mailed Jul. 21, 2010 for U.S. Appl. No. 12/140,217.

"FAQs About the ZeroDegrees Service," visited on Sep. 8, 2004, http://www.zerodegrees.com/faq.htm.

"Welcome to the Christian Connection Matchmaker," http://web.archive.org/web/19990222170152/http://www.christian.email.net/index/html, Feb. 22, 1999.

Ethier, J., "Current Research in Social Network Theory," http://upaya.soc.neu.edu/archive/students/Ethier-SocialNetworks.html.

Jordan et al., "The Augmented Social Network: Building Identity and Trust into the Next-Generation Internet," first monday Peer-Reviewed Journal on the Internet, www.firstmonday.dk/issues/issue8_8/jordan/, pp. 1-62.

myspace.com, "Home Page," http://www.myspace.com.

myspace.com, "About Us," http://www.myspace.com/Modules/Common/Pages/AboutUs.aspx.

"Qix Benefits," Zi Cororation, http://zicorp.com/QixBenefits.htm.

"Qix Functions," Zi Corporation, http://www.zicorp.com/QixFunctions.htm.

International Preliminary Report on Patentability mailed Nov. 6, 2008 for International Patent Application No. PCT/US2007/066820.

Office Communication for U.S. Appl. No. 12/140,217 mailed Feb. 4, 2011.

* cited by examiner

FIG. 7

Latest from my friends and favorites

Lynn S
- Send IM
- Send Message
- New Profile

Kids today... --> Click here  Reply

Blast Message - Wed Mar 01 10:12am PST ian c ro...
- Offline IM
- Send Message

BarCamp LA This Weekend!
BarCamp LA is this weekend! What is BarCamp? BarCamp is an ad-hoc un-conference born from the desire for people to share and learn in an open environment. It is an...
View Blog Blog Post - Tue Feb 28 09:32pm PST jeffb
- Offline IM
- Send Message
- New Feed

View PhotoStream

Photostream - Tue Feb 28 08:27pm PST

Kim L
- Offline IM
- Send Message
- New Profile great music
okay, so i rarely blog, but i am trying to do more of it and this time i am promoting a friend of mine. if Lucinda Williams and Tim Easton are coming anywhere near you  View Blog Blog Post - Tue Feb 28 03:14pm PST ed contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship.

SOCIAL NETWORKING FOR MOBILE DEVICES

FIELD OF THE INVENTION

The present invention relates generally to mobile communications and, more particularly, but not exclusively to enabling a mobile device member of a social network to create an integrated live view of information based in part on social networking information.

BACKGROUND OF THE INVENTION

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and the world.

The development of such online social networks touch countless aspects of our everyday lives, providing instant access to people of similar mindsets, and enabling us to form partnerships with more people in more ways than ever before.

However, as social networking transforms our lives, many businesses continue to struggle to keep up, and provide value to the consumer in such a structure. Without the ability to extend value to a consumer's online experience, consumer loyalty to a business may quickly diminish. Thus, many businesses are searching for new ways to integrate social networking into their online business models with features that appeal to the consumer, while making a profit. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 7 shows one embodiment of a live contact list of social networking members generated, at least in part, using vitality information;

DETAILED DESCRIPTION OF THE INVENTION

Figure 1:
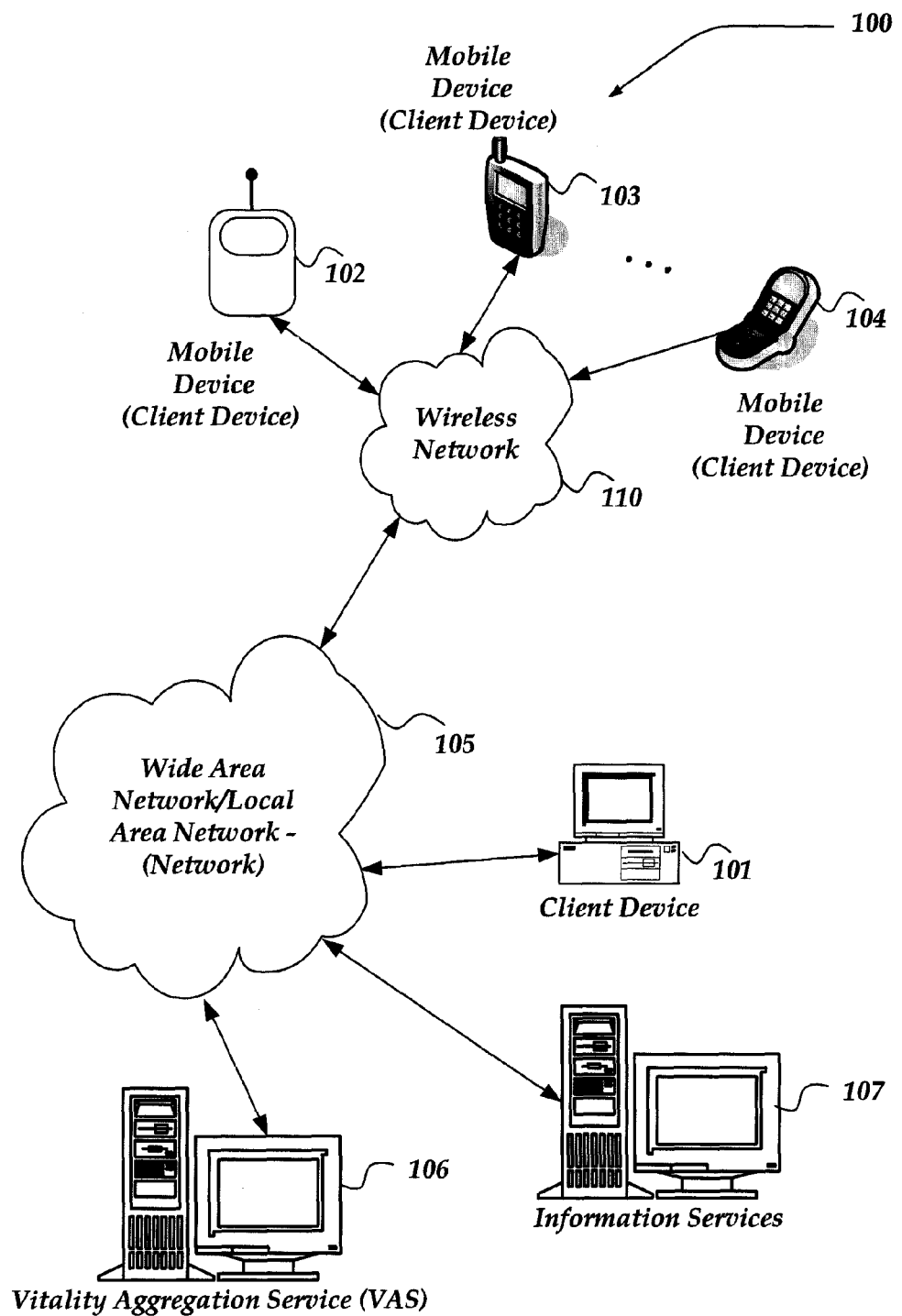
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

As used herein, "live" or a "live view" refers to providing of real-time or approximately real-time data. It is recognized that due to a variety of reasons, transfer of data over a network may be delayed by some varying amount of time. The delay may vary based on conditions of the network, configurations of the network, configuration of the sending and/or receiving device, or the like. Thus, live or a live view may range between real-time data transfers to some varying amount of time delay.

The term "vitality" as used herein refers to online and/or offline activities of a member of a social network. Thus, vitality information is directed towards capturing these aspects of a social community, through various communications between members, and their activities, states, and/or moods of various members, or the like. Vitality information may include, but is not limited to a location of the mobile device, weather information where the member is located, an event, information from the mobile user's calendar or even a friend's calendar, information from the mobile user's task list, past behavior of the mobile user and/or another member of the social network, the mobile user's preferences, a mood of a social network member, a mood of the mobile user, photographs, video files, audio files, internet links, information from a blog, an Really Simple Syndication (RSS) feed, Instant Messages (IMs), blog entries, emails, or the like, and even information about physical (e.g., geographical) proximity of the mobile user's social contacts, what the mobile user is doing at the moment in the real world, or the like. Vitality information however, is not limited to these examples, and other information that may describe the lively, open, or animated aspects of a social network may also be employed.

Moreover, the term "social networking information," includes vitality information. However, social networking information refers to both dynamic as well as less dynamic characteristics of a social network. Social networking information includes various profile information about a member, including, but not limited to the member's avatar, contact information, the member's preferences, degrees of separation between the member and another member, a membership in an activity, group, or the like, or the like.

Social networking information further may include various information about communications between the member and other members in the social network, including, but not limited to emails, SMS messages, IM messages, Multimedia Message (MMS) messages, alerts, audio messages, phone calls, either received or sent by the member, or the like.

Various "meta-data" may also be associated with the social networking information. Thus, for example, various permissions for access may be associated with at least some of the social networking information. Some access permissions (or sharing rules) may be selected, for example, based, in part, on an input by the member, while other access permissions may be defaulted based on other events, constraints, or the like.

Briefly stated the present invention is directed towards enabling integrated live views of activities of a mobile user's contacts to provide the mobile user with information in a social networking context. The integrated live views may be provided by employing social networking vitality information to generate a live contact list. Such vitality information may include moods of a person, avatars, status of an individuals mobile activities including whether they are in an IM session, or the like, as well as other information as described above. Integrated live views may also be provided in a variety of other perspectives, including, but not limited to integrated live: group views, friend views, activity oriented views, or the like, based on the mobile user's social networking information, including vitality information. Use of social networking information provides a more dynamic and potentially changing view of the mobile user's relationships with other members of their social network, unlike traditional views that may lack this dynamic and more personal perspective. Moreover, traditional views on a mobile device may limit how the mobile user may organize received information. That is, traditional views may provide contact information, but it typically is not integrated with IM status, mood status, email status, or the like. Similarly, traditional views may provide IM status, but it typically is not integrated with calendar information, location information, or the like. Thus, live views enable an integrated, and more personalized perspective of a mobile user's social and other communication activities.

Moreover, by providing the mobile user with integrated live views of their social network, the invention enables the mobile user to more effectively manage their spare or unplanned time. By viewing one's live contact lists, or other integrated live views, the mobile user may be able to obtain and respond to invites from a social network member, provide opportunities for activities for other members, or generally communicate with other members of their social network.

Similarly, by providing the mobile user with integrated live views of their social network, the invention enables the mobile user to make decisions about what type of content to download to, synchronize (sync) to, and/or consume on their mobile device. By viewing a list of news articles that has information about who within one's social network has read, commented on, or shared over some time period, the user may make a specific decision about a piece of content available to them on their mobile device that they would not have otherwise made without the social networking context.

Similarly, by providing the mobile user with integrated live views of their social network, the invention enables the mobile user to make decisions about where to go in the real world. By viewing a map of on a mobile device that has information about which restaurants members of their social network have eaten at, reviewed, or are at which they presently eating at the moment, the user may make a specific decision about a piece of content available to them on their mobile device that they would not have otherwise made without the social networking context.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Vitality Aggregation Service (VAS) 106, mobile devices (client devices) 102-104, client device 101, and information services 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to VAS 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as VAS 106, client device 101, or the like. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by another computing device, such as VAS 106. Such end-user account, for example, may be configured to enable the end-user to receive emails, send/receive IM messages, SMS messages, access selected web pages, participate in a social networking activity, or the like. However, participation in various social networking activities may also be performed without logging into the end-user account.

In addition, mobile devices 102-104 may include another application that is configured to enable the mobile user to display and interact with various integrated live views that are configured based, in part, on the mobile user's social networking activities, experiences, and the like, including vitality information associated with the mobile user's social network. The integrated live views may be directed towards providing the mobile user with a virtual 'hang-out' space for participating in various social events, including but not limited to sending/receiving photos between social networking members, 'chit-chatting' with members, blogging, sharing visual mood representations, sharing various messages, and generally participating in a variety of integrated social experiences beyond merely voice communications or text messages (e.g., IM). Moreover, such integrated live views enable the mobile user to configure highly personalized views and identities in virtual spaces within their social network.

Mobile devices 102-104 may also communicate with non-mobile client devices, such as client device 101, or the like. In one embodiment, such communications may include participation in social networking activities, including sharing of photographs, participating in determining how to spend time with other members, sending/receiving of messages, providing information based on physical proximity between members, or similar virtual hang-out activities.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple VAS 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between VAS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of VAS 106 is described in more detail below in conjunction with FIG. 3. Briefly, however, VAS 106 may include any computing device capable of connecting to network 105 to enable aggregation and management of social networking information, including vitality information. VAS 106 may receive from various participants in a social network, information including information associated with activities, moods, events, messages, vitality information, communications, or the like. VAS 106 may also receive social networking information from a variety of other sources including, for example, information services 107. VAS 106 may store at least some of the received information for use by one or more social networking members. VAS 106 may also aggregate a portion of the received social networking information and enable one or more social networking members to receive and/or use at least a portion of the aggregated information.

Devices that may operate as VAS 106 include personal computers desktop computers, multiprocessor systems, microprocessor-based or programmable consumer electronics, network PCs, servers, and the like.

Although FIG. 1 illustrates VAS 106 as a single computing device, the invention is not so limited. For example, one or more functions of VAS 106 may be distributed across one or more distinct computing devices. For example, managing various social networking activities, including sharing of photographs, managing Instant Messaging (IM) session, SMS messages, email messages, sharing of contact information, aggregating and/or storing of social networking information, or the like, may be performed by a plurality of computing devices, without departing from the scope or spirit of the present invention.

Information services 107 represents a variety of service devices that may provide additional information for use in generating integrated live views on mobile devices 102-104. Such services include, but are not limited to web services, third-party services, audio services, video services, email services, IM services, SMS services, VOIP services, calendaring services, photo services, or the like. Devices that may operate as information services 107 include personal computers desktop computers, multiprocessor systems, microprocessor-based or programmable consumer electronics, network PCs, servers, and the like.

Illustrative Mobile Client Environment

Figure 2:
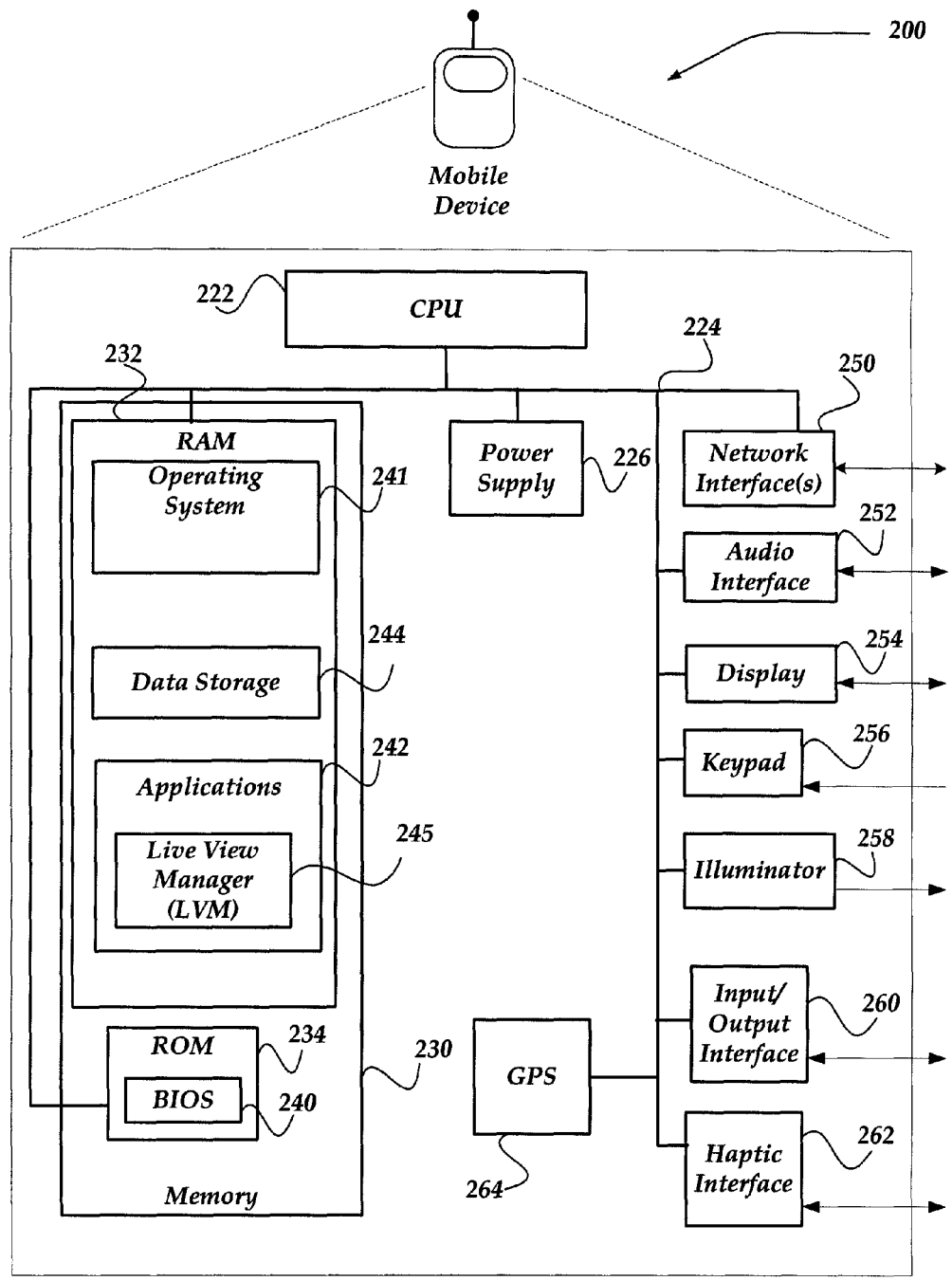
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store social networking information including vitality information, or the like. At least a portion of the social networking information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may further include live view manager (LVM) 245.

LVM 245 may be configured to receive and enable a display of integrated live views into a social network member's activities. For example, one embodiment of an integrated live view includes a live contact list that integrates a contact's social activities including IM status, SMS status, email status, photographs, blog updates, RSS feeds, recent messages, icons or other visual representations, mood indicators, and the like. LVM 245 further enables the user of mobile device 200 to select different integrated live views including, but not limited to integrated live views based on a social networking relationship such as friends, degrees of separation, activities, work relationships, family relationships, or the like. In one embodiment, LVM 245 enables the user to sort a list of displayed contacts based on a variety of criteria, including but not limited to current online activities, moods, messages, member relationships, physical proximity to other members (at indicated by their client device), or the like. Various embodiments of integrated live views are described in more detail below in conjunction with FIGS. 6-9. Moreover, LVM 245 may employ a process substantially similar to that described below in conjunction with FIG. 5.

Illustrative Server Environment

Figure 3:
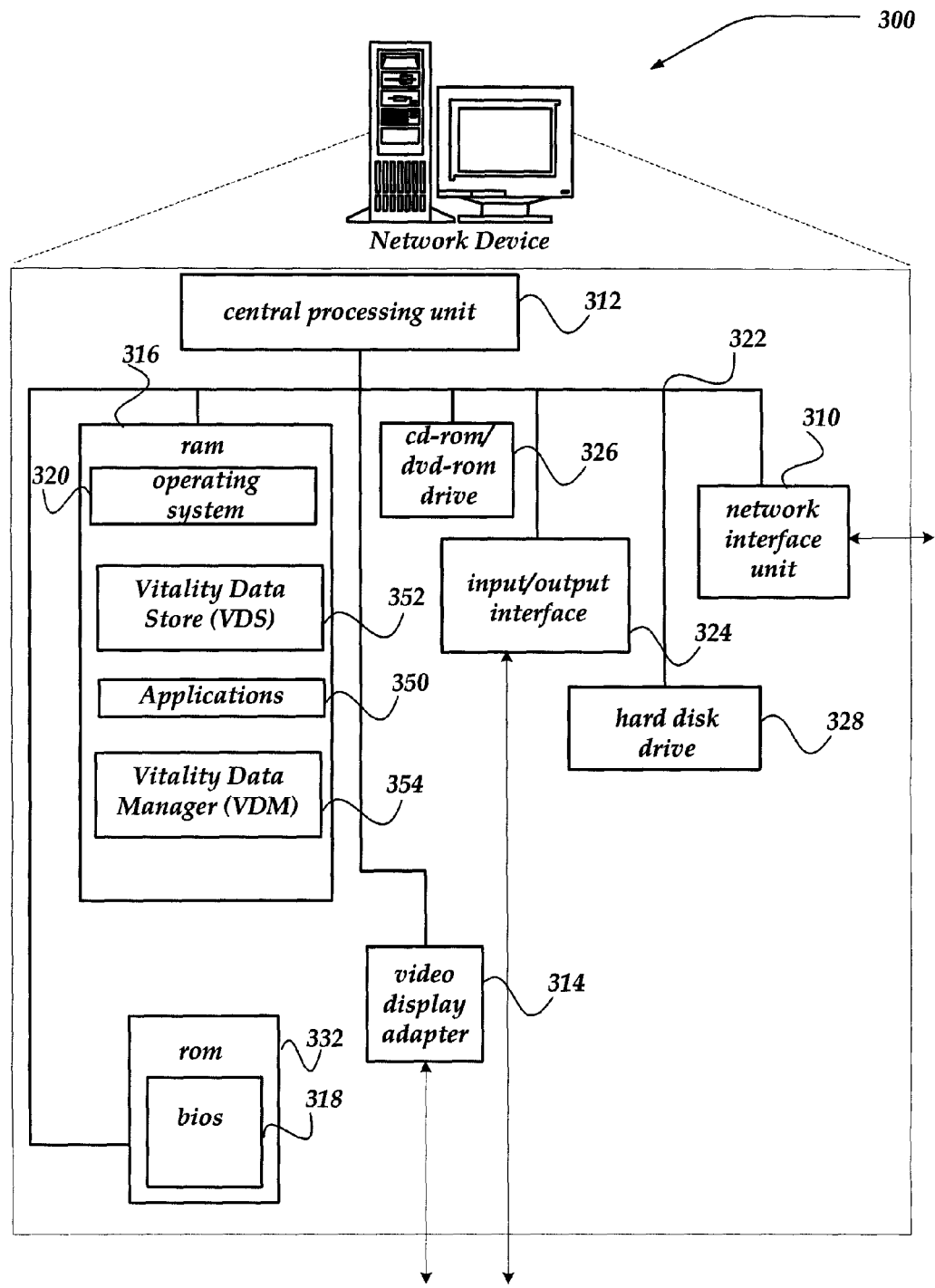
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, VAS 106 of FIG. 1.

Network device 300 includes processing unit 312, video display adapter 314, an input/output interface 260, and a mass memory, all in communication with each other via bus 322. The mass memory generally includes RAM 316, ROM 332, and one or more permanent mass storage devices, such as hard disk drive 328, tape drive, optical drive CD-ROM / DVD-ROM 326, and/or floppy disk drive. The mass memory stores operating system 320 for controlling the operation of network device 300. Any general purpose operating system may be employed. Basic input/output system ("BIOS") 318 is also provided for controlling the low level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Vitality Data Manager (VDM) 354 may also be included as an application program within applications 350.

VDM 354 is configured to receive from a variety of sources information that may be associated with social networking activities of various social networking members. Such information may include but is not limited to various communications, including emails, SMS messages, IM messages, audio messages, VOIP messages, RSS feeds, membership information, calendar events, photo streams, photographs, blog updates, web pages, mood information, behaviors of social network members, or the like. VDM 354 may aggregate or otherwise combine at least some of the received information to generate aggregate vitality information such as a mood of a group, organization, or the like, group events, albums, aggregate music selections, tags, or the like. VDM 354 may store at least some of the received and/or aggregated information in Vitality Data Store (VDS) 352, which may be implemented as a database, a folder, program, or the like. VDM 354 may also distribute at least some of the received and/or aggregated information to one or more social networking members, such as mobile devices 102-104 and/or client device 101 of FIG. 1 or the like. VDM 354 may employ a process substantially similar to that described below in conjunction with FIG. 4.

Generalized Operation

Figure 4:
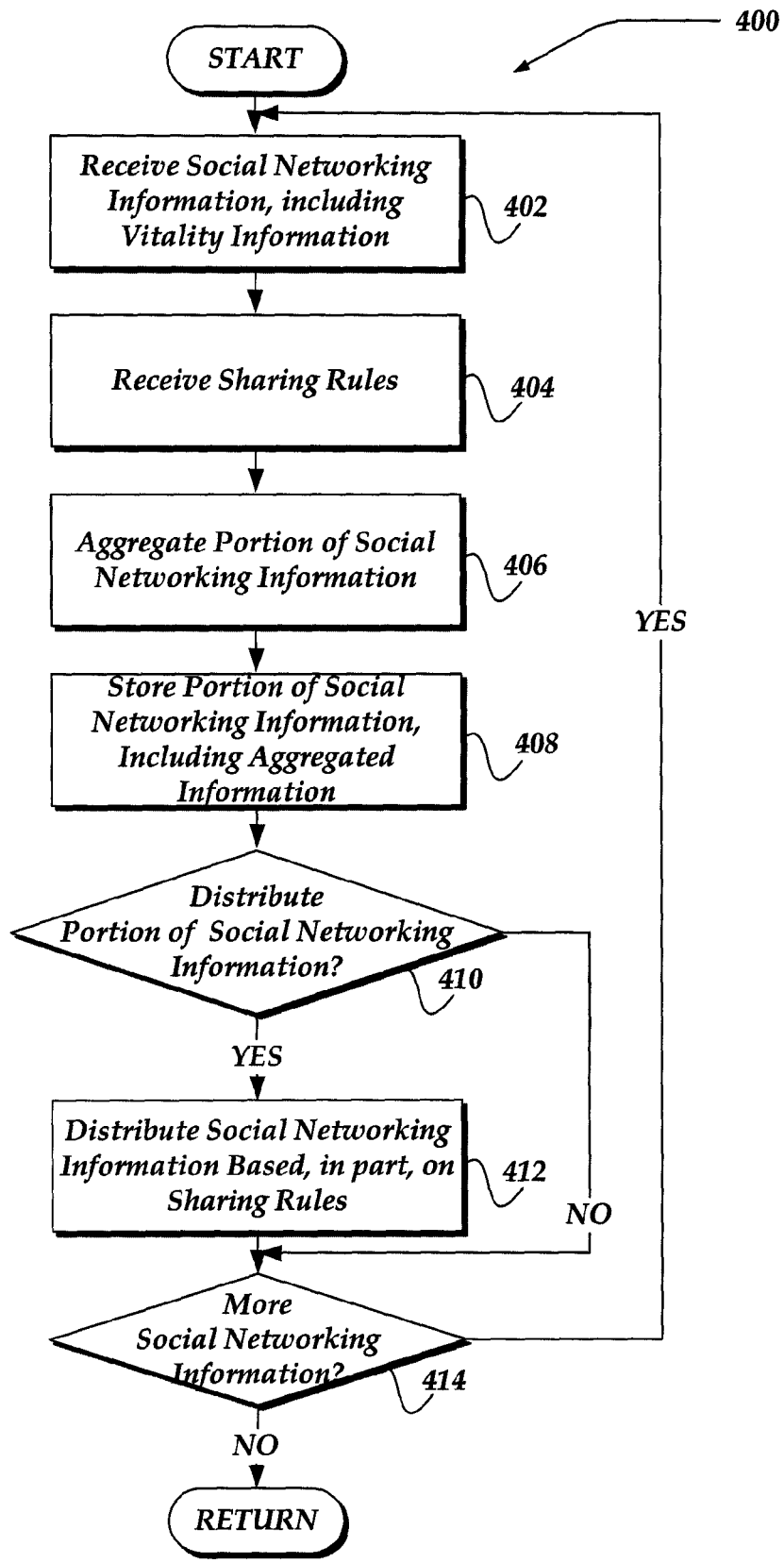
FIG. 4 illustrates a logical flow diagram generally showing one embodiment of a process for managing social networking information, including vitality information for social networking members.
Figure 5:
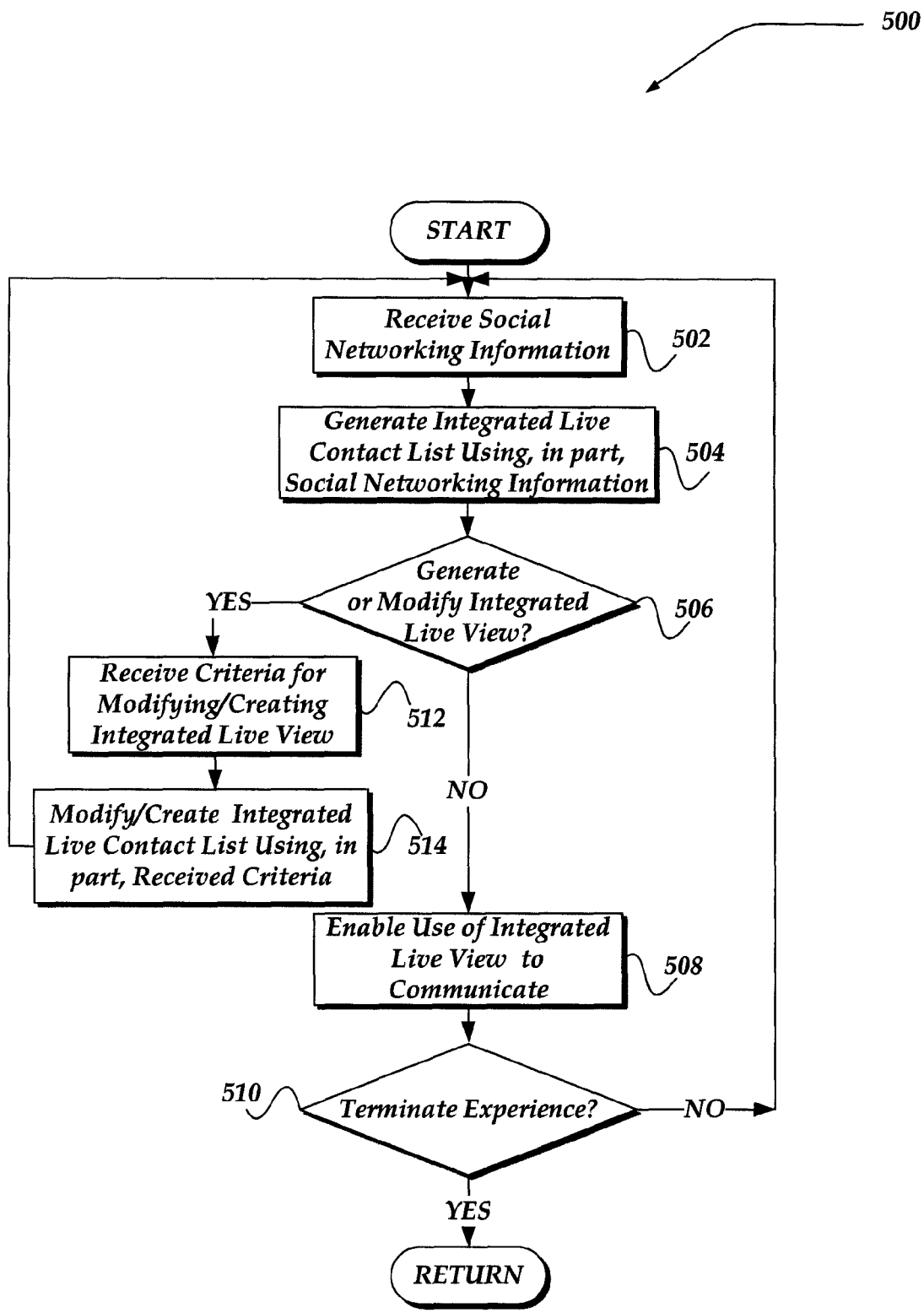
FIG. 5 illustrates a logical flow diagram generally showing one embodiment of a process for enabling a mobile virtual hang-out space using a live contact list of a social network member activities based, at least in part, on vitality information.
Figure 6:
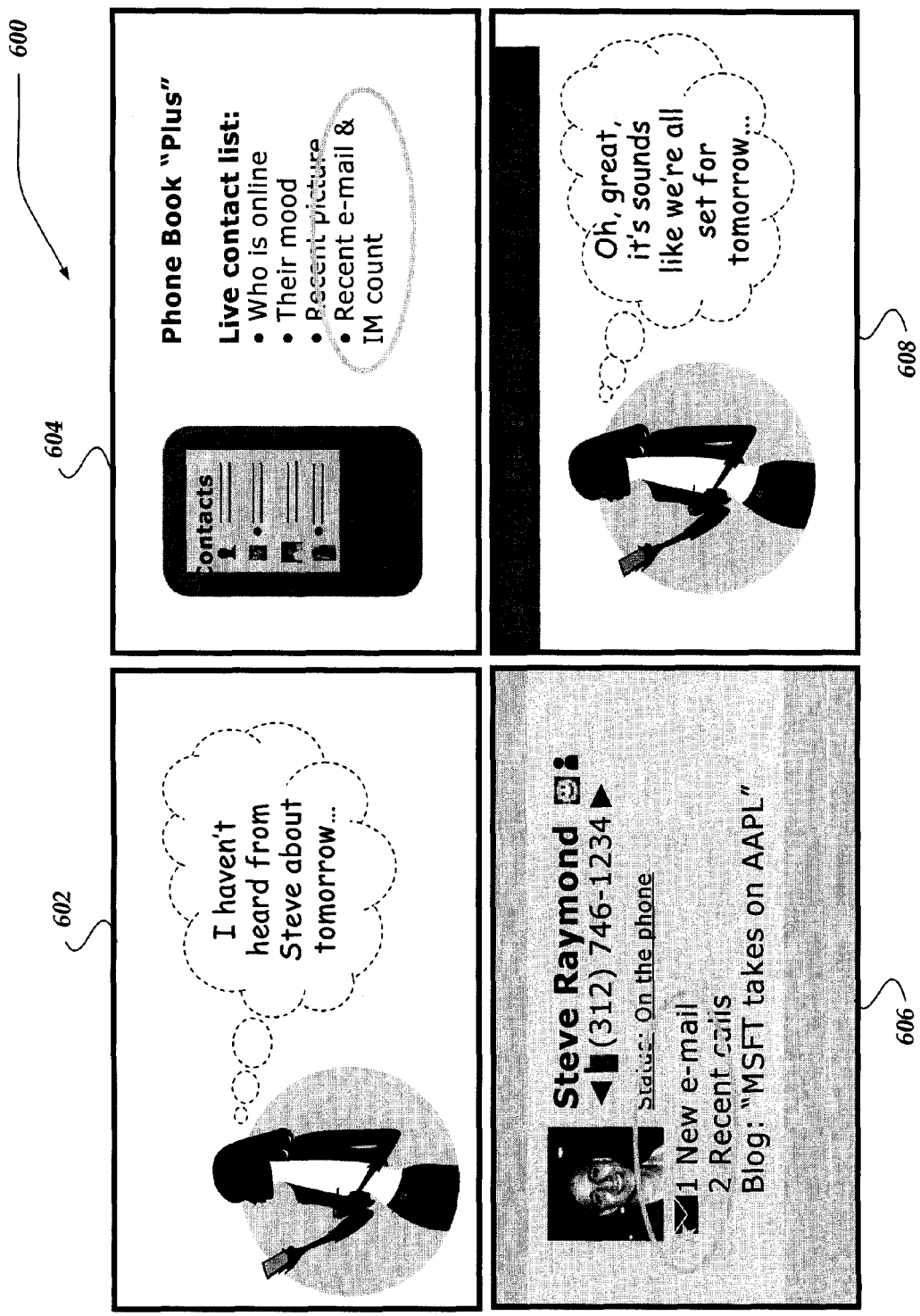
FIG. 6 shows one embodiment of a use case illustrating use of a live contact list of social members.
Figure 8:
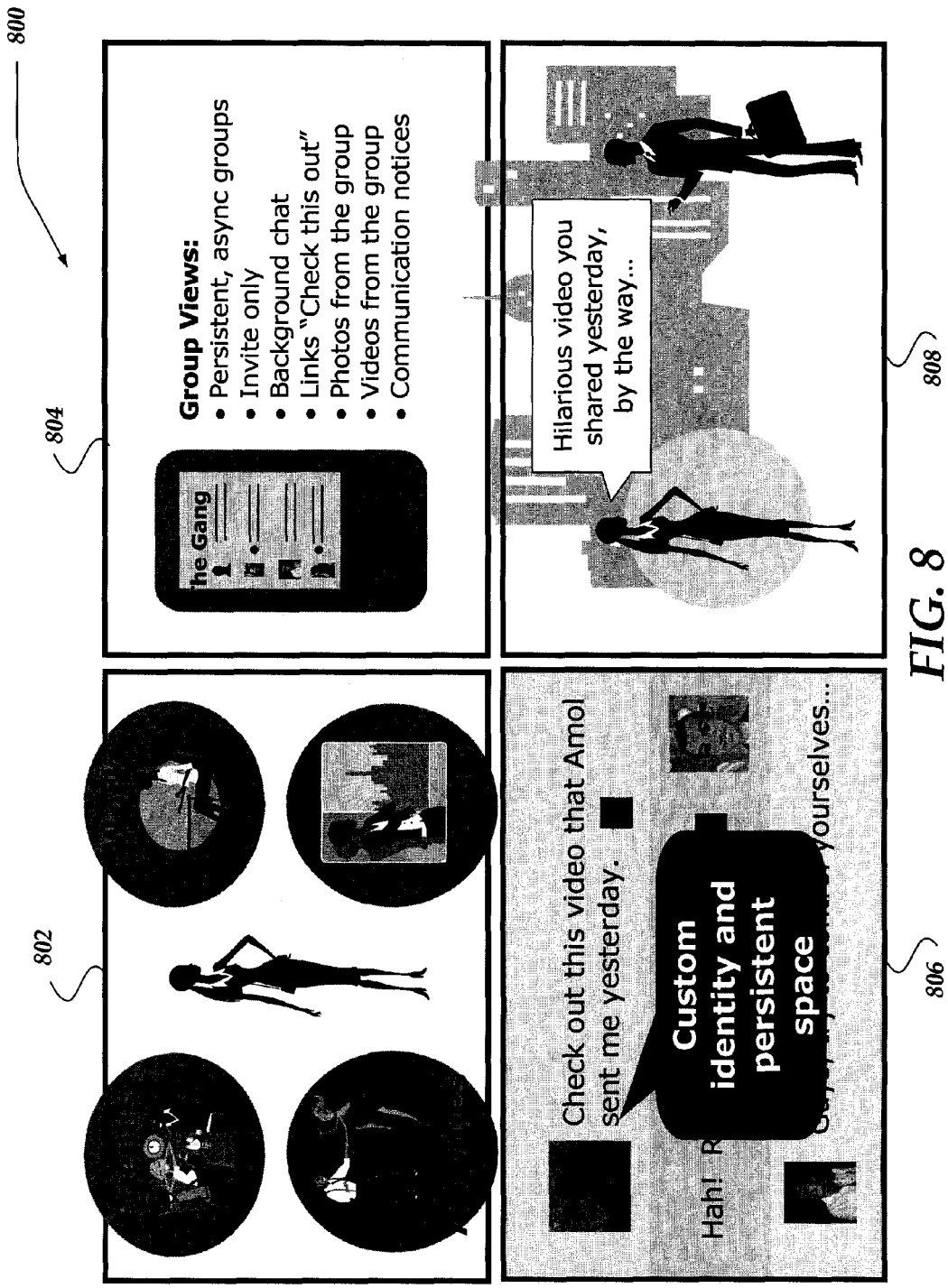
FIG. 8 shows one embodiment of a use case illustrating use of a group view of social network members.

The operation of certain aspects of the invention will now be described with respect to FIGS. 4-8. FIGS. 4-5 provide logical flow diagrams of certain aspects, while FIGS. 6-8 provide use case examples to further illustrate the invention.

Thus, FIG. 4 illustrates a logical flow diagram generally showing one embodiment of a process for managing social networking information, including vitality information for social networking members. Process 400 of FIG. 4 may be implemented within VAS 106 of FIG. 1.

Process 400 begins, after a start block, at block 402, where social networking information, including vitality information is received from a variety of sources. In one embodiment, the social networking information may be received from a plurality of mobile devices, RSS services, IM services, email services, VOIP services, audio services, web services, graphics services, or the like. For example, a social networking member may provide a mood avatar, photograph, or information from a blog. In another example, a web service, or other service may provide photographs, audio files, or the like. In one embodiment, information may be received, absent a solicitation for the information. In another embodiment, a request for information may be sent to various services, mobile devices, client devices, or the like. The received information may include various vitality information including, but not limited to mood information, location information, IM or other communication status, information indicating a change in a blog status, or any of the other vitality information described above.

Processing then flows to block 404 where sharing rules are received. In one embodiment, a sending device may also employ sharing rules to determine whether to send particular vitality information. For example, a mobile user, or the like, may elect not to communicate their physical location. Therefore, such information might not be received for some social networking members. In another embodiment, sharing rules may be received prior to or even coincident with some portion of social networking information. For example, in one embodiment, a photo sharing service may send a selection of photographs, or the like, with sharing rules that indicate whether a social networking member may receive or otherwise access one or more of the photographs. Such sharing rules therefore, indicate which social networking member(s) may receive or otherwise access which portion of social networking information. Thus, sharing rules include various criteria, events, triggers, permissions, or the like.

Process 400 then flows to block 406 where based in part on the sharing rules, at least some of the received social networking information, including at least some of the vitality information may be aggregated, or otherwise combined. For example, where a predefined group of social networking members provide a mood identifier that indicates a similar mood, an aggregated mood might be generated for the group. As another example, where several social networking members have provided an opinion on a blog, a restaurant, an event, or the like, an aggregated opinion may be generated. Clearly, the invention, however, is not limited to these examples, and a variety of other received social networking information may be aggregated, without departing from the scope or spirit of the invention.

Processing then flows to block 408, where at least some of the received social networking information, including vitality information, and aggregated information may be stored. Storage of such information enables distribution at some other time, additional aggregation, and/or other analysis to be performed, or the like. However, storage of social networking information may be, in at least one embodiment, optional.

Flowing next to decision block 410, a determination is made whether to distribute at least a portion of the social networking information. Distribution may be performed based on a variety of criteria, including but not limited to, sending the information as soon as it is received, sending at least some of the information based on an event, time, or the like. For example, in one embodiment, some of the information may be distributed in real-time, while other information may be distributed based on an event, or the like. In any event, if distribution of social networking information is to occur, processing flows to block 412; otherwise, processing flows to decision block 414.

At block 412, the social networking information, including at least some aggregation information, is distributed to at least one mobile device, based on the received sharing rules. Processing then flows to decision block 414.

At decision block 414, a determination is made whether there is more social networking information to manage. If there is more social networking information to manage, processing branches back to block 402; otherwise, processing returns to a calling process to perform other actions.

FIG. 5 illustrates a logical flow diagram generally showing one embodiment of a process for enabling a mobile device to employ a virtual hang-out space using integrated live views of a social network member's activities based, at least in part, on vitality information. Process 500 of FIG. 5 may be implemented, for example, within one of mobile devices 102-104 of FIG. 1.

Process 500 begins, after a start block, at block 502, where the mobile device receives various social networking information based in part on various sharing rules. In one embodiment, some of the information may be received in real-time, including such as IM messages, audio communications, or the like.

Processing flows next to block 504 where the mobile device employs the social networking information to generate, and/or update an integrated live contact list. The integrated live contact list may be generated based on a default configuration, and/or based, at least in part, on any user customization of the display. Thus, while an integrated live contact list may display a list of contacts within the mobile user's contact list, it may display the list based on a variety of criteria. For example, the mobile user may elect to have the integrated live contact list be ordered based on whether the contact is currently in an active IM session, whether the contact is within a predetermined physical proximity to the mobile user, or the like. In one embodiment, the integrated live contact list may be organized based on some other grouping, including whether the contact is a family member, a friend, a worker, a member of a predefined activity, of the like.

Process 500 flows next to decision block 506, where a determination is made whether to modify or otherwise generate another integrated live view of contact information. If a modification or generation of another integrated live view is to be performed, processing flows to block 512; otherwise, processing continues to block 508.

At block 512, the mobile user may provide to the mobile device various criteria for organizing another integrated live view, including those suggested above. However, the invention is not limited to these examples, and any of a variety of other criteria may be employed to organize or otherwise create a unique integrated live view of contacts that may be personalized to a mobile user. For example, the mobile user may elect to organize the contact list based on the contact's current mood, blog activity, or the like. In any event, processing flows next to block 514, where the received criteria are employed to generate another integrated live view. In one embodiment, the generated integrated live view may be in addition to the integrated live contact list employed at block 504. In one embodiment, the generated integrated live view may replace the integrated live contact list employed at block 504, such that only a single integrated live view is available to the mobile user. In any event, processing loops back to block 502 to continue the process.

At block 508, however, the integrated live views displayed to the mobile user may be employed to enable the mobile user to perform a variety of communication activities. By integrating various social networking activities into the live view, the mobile user is provided with a more personal and useful perspective of their social network, Processing flows next to decision block 510, where a determination is made whether the mobile user is to terminate their mobile networking experience. If so, processing returns to a calling block to perform other actions; otherwise, processing loops back to block 502.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Use Cases

Next are described embodiments of possible use cases that are directed towards illustrating how integration of various communications and social networking information enables a mobile user to manage their time and resources. It should be noted however, that the presented user cases are intended as examples, only, and are not intended to limit or otherwise restrict the invention or its uses. Thus, for example, FIG. 6 shows one embodiment of a use case illustrating use of a live contact list of social members.

As shown in use case 600 of FIG. 6, a mobile user may employ an integrated live contact list to address immediate questions regarding a status of a social networking member (block 602). Using one embodiment of an integrated live contact list, in block 604, the mobile user may quickly locate status of the social networking member. Shown in block 604 is one embodiment of an integrated live contact list that may provide a list of contacts, along with various social networking information. The integrated live contact list may include, but is not limited to, whether the contact is on-line or not, what their mood may be as indicated by an avatar, or other mood identifier, a recent photograph of the contact, a recent email status, an IM count or status, or the like. While such information may be at least in part available on various other screens of a traditional mobile device, the present invention, through the novel concept of a live contact list, provides an integrated and current perspective of the mobile user's social networking contacts.

Block 606 illustrates one embodiment, of a contact within the integrated live contact list. In one embodiment, block 606 may a view within block 604. In another embodiment, block 606 may be an expansion of a selected contact from block 604. That is, selection of a contact may provide additional social networking information than shown in block 604. This may occur, for example, where a mobile device's display screen is too small, or of too low of a resolution, or the like, to provide the mobile user with the requested social networking information for a contact. In any event, the mobile user may, in block 608, determine an answer to a question about the status of the social networking member based on the content of the live contact list, or selection therein.

FIG. 7 shows one embodiment of an integrated live contact list of social networking members generated, at least in part, using vitality information. Integrated Live Contact list 700 of FIG. 7 enables a mobile user to obtain an integrated live contact view of social networking members along with social networking information. As shown, integrated live contact list 700 may have for a given social networking member, a photograph 702 displayed, communication status 704 that may include whether the social networking member is in an IM session, offline from IM, has sent an email message, has a new RSS feed 712, new profile, new blog information, or the like. Where the social networking member may be in an IM session with the mobile user, the IM session 706 may be integrated into the same integrated live contact list 700 screen display. Moreover, the integrated live contact list 700 may also integrate other social networking information, including, but not limited to blog information 708, photographs 710, or the like.

FIG. 8 shows one embodiment of a use case illustrating use of an integrated group live view of social network members. As described above, the mobile user may organize integrated live contact views based on any of a variety of criteria 802, including, family relationships, work relationships, friends, activities, or the like. Thus, integrated live contact list 804 illustrates one embodiment of a live contact list organized based on whether the social networking member is a member of "the gang," (which, for example, may represent a friend relationship, an activity relationship, or the like). As shown, integrated live contact list 804 may include members based, for example, on an invite only basis. Moreover, integrated live contact list 804 may be personalized to include links, photographs from the group (aggregate information), videos from the group, aggregated communication notices, or the like. It should be clear, that while one mobile device user may employ a group view, other mobile device users associated with the group may employ a different integrated live view, with different social networking information displayed.

Block 806 illustrates that a social networking member may also provide content, such as avatars, photographs, or the like, that may be shared by 'the gang," shared only by a subset of the "the gang," or the like. In any event, use of personalized live contact lists enable the mobile user to enjoy a more customized 'hang-out' virtual space for communicating, and sharing experiences, which may then translate into non-mobile social experiences (see block 808).

Figure 9:
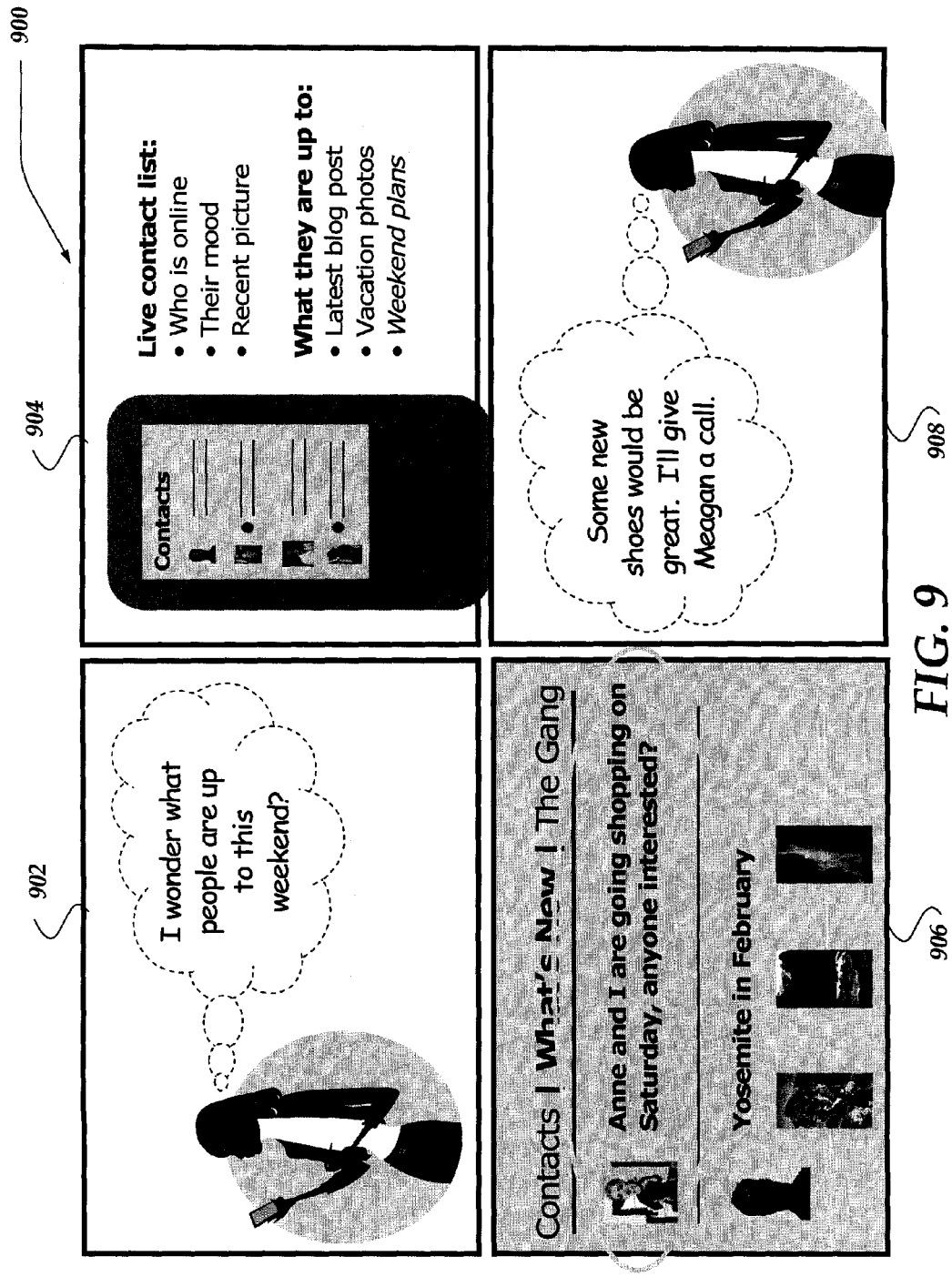
FIG. 9 shows one embodiment of a use case illustrating use of a live contact list of social members for just-in-time management of a mobile user's time, in accordance with the present invention.

FIG. 9 shows one embodiment of a use case illustrating use of an integrated live contact list of social members for just-in-time management of a mobile user's time, in accordance with the present invention. As the mobile user personalizes their live contact list views, integrating various social networking information, they are enabled to manage their time and/or other resources potentially more efficiently. As shown in use case 900, the mobile user may desire to take advantage, for example, of some open time. The mobile user in block 902 may wish to find out what some of their social networking members may be doing during that time. Using the integrated live contact list 904, the mobile user may be able to quickly view what plans other social networking members may be suggesting for that time. Moreover, the mobile user may be able to make a determination that they have some available time based on integration of such vitality information as where the mobile user is physically located, input from the mobile user's calendar, task list, time of day, and perhaps even similar information from one or more other social networking members. In one embodiment, the other social networking members may be selected based on their physical proximity to the mobile user, and/or an amount of time available. In addition, in one embodiment, the invention may compare the vitality information and identify to one or more social networking members of the availability of a period of time.

In one embodiment, where no plans are identified, the mobile user may inject a question, suggestion, or the like into the membership (see block 906), and view proposed responses (see blocks 906 and 908).

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A mobile device, comprising:
   a memory component for storing data; and
   a processing component for executing data that enables actions, including:
   accessing a list of contacts of a user of the mobile device;
   receiving social networking information, including a real time aggregation of current vitality information of at least a subset of contacts of the list of contacts, the current vitality information is received from a plurality of third party sources separate from the plurality of mobile devices;
   generating for display at least one integrated live contact list comprising, for each of the subset of contacts, the current vitality information received from the plurality of third party sources, the integrated live contact list is further configured for producing at least one integrated live view upon the user's request;
   integrating into the integrated live contact list communications exchanged by at least one of the subset of contacts with the user of the mobile device; and
   displaying the integrated live contact list comprising the vitality information and the exchanged communications on the mobile device.

2. The mobile device of claim 1, the actions further comprising:
   providing an integrated live view indicating available time for the user of the mobile device based on social networking information, including vitality information including a physical proximity to another social networking member, time of day, information within a calendar, or information within a task list; and
   enabling an interaction with at least one contact in the integrated live view to manage a social activity.

3. The mobile device of claim 1, wherein generating the at least one integrated live view further comprises generating an integrated live view based on at least one of a social networking relationship, a physical proximity between a social networking member, or an activity.

4. The mobile device of Claim 1, wherein generating an integrated live view further comprises:
   providing an integrated live contact list that comprises at least one of an online network status, a mood, an avatar, a photograph, a message count, a social networking relationship identifier a text message, or information associated with a blog for at least one contact with the integrated live contact list.

5. The mobile device of claim 4, the actions further comprising:
   ordering the integrated live contact list based on a user selected criteria from the social networking information, including vitality information;
   receiving an update to the integrated live contact list; and updating the integrated live contact list based on the user selected criteria.

6. The mobile device of claim 1, wherein the vitality information further comprises at least one of a location of the mobile device, an event in a calendar, a task, a current message activity, a past behavior of a mobile user associated with the mobile device, a social event, a shared photo, media object, URL, a document, a currently playing audio file, a currently watched video, a news article, an information article reviewed by a member, or an aggregate behavior of a member.

7. A non-transitory processor readable medium that includes data, wherein the execution of the data provides for managing mobile communication over a network between a plurality of mobile devices by enabling actions, including:
  accessing a list of contacts of a user of the mobile device;
  receiving social networking information, including a real time aggregation of current vitality information of at least a subset of contacts from the list of contacts, the current vitality information is received from a plurality of third party sources separate from the plurality of mobile devices;
  generating for display an integrated live contact list comprising for each of the subset of contacts, the current vitality information received from the plurality of third party sources;
  integrating into the integrated live contact list communications exchanged by at least one of the subset of contacts with the user of the mobile device; and
  displaying the integrated live contact list comprising the exchanged communications on the mobile device.

8. The non-transitory processor readable medium of claim 7, wherein generating the integrated live contact list further comprises:
  generating the integrated live contact list based on at least one social networking member relationship including at least one of a group relationship, a family relationship, a work relationship, or an activity relationship.

9. The non-transitory processor readable medium of claim 7, wherein the integrated live contact list further comprises information associated with the at least one member including at least one of an online status, an email message status, a blog status, a mood, or a photograph.

10. The non-transitory processor readable medium of claim 7, the actions further comprising:
  ordering the integrated live contact list to display the at least one member based in part on a social networking relationship to a user of the processor readable medium, or a physical proximity between the at least one member and the user of the processor readable medium;
  receiving an update to the integrated live contact list; and
  reordering the updated integrated live contact list based the social networking relationship to the user or the physical proximity between the at least one member and the user.

11. The non-transitory processor readable medium of claim 7, wherein the integrated live contact list further comprises status of an activity associated with the at least one member.

12. A network device, comprising:
  a transceiver to send and receive data over the network; and
  a processor that is operative to perform actions, including:
    receiving social networking information, including vitality information for a plurality of social networking members from a plurality of information services separate from the plurality of mobile devices;
    aggregating in real time the social networking information received from the plurality of information services;
    receiving sharing rules associated with at least some of the social networking information;
    distributing to at least one of the mobile devices, the social networking information based on a respective list of contacts associated with the mobile device and the sharing rules;
    configuring the at least one mobile device for generation of an integrated live contact list that is configured to display, the social networking information received from the plurality of information services for the social networking members listed in the list of contacts;
    enabling a user of the at least one mobile device to exchange communications with the at least one social networking member included in the integrated live contact list; and
    configuring the at least one mobile device to display within the integrated live contact list, the exchanged communications.

13. The network device of claim 12, the actions further comprising:
  aggregating at least a portion of the social networking information for a subset of the plurality of social networking members; and
  distributing the aggregated social networking information to the at least one mobile device.

14. The network device of claim 12, wherein the mobile device is further configured to employ the social networking information to modify the integrated live contact list based on at least one of a social networking relationship, an online status, a mood, or an event.

15. The network device of claim 12, wherein distributing the social networking information further enables the mobile device to display an integrated live view.

16. The network device of claim 12, wherein the integrated live contact list is configured to display a photograph, an online status, and an email message status for at least one social networking member.

17. A method of managing mobile communication over a network; comprising:
  accessing a list of contacts of a mobile device user;
  receiving social networking information, including a real time aggregation of current vitality information of at least a subset of contacts of the list of contacts, the current vitality information is received from a plurality of third party sources separate from the plurality of mobile devices;
  generating at least one integrated live contact list comprising, for each of the subset of contacts, the real time aggregation of current vitality information received from the plurality of third party sources;
  integrating into the integrated live contact list communications exchanged by at least one of the subset of contacts with the user of the mobile device; and
  displaying the at least one integrated live contact list comprising the exchanged communications on the mobile device for use in engaging in a social networking activity.

18. The method of claim 17, further comprising:
  providing an integrated live contact list that is based at least in part on the social networking including vitality information; and
  enabling an interaction with at least one contact in the integrated live contact list to manage a social activity, including at least one or an inspirational activity, or an event planning activity.

19. The method of claim 17, wherein generating the at least one integrated live view further comprises:
- organizing the integrated live view based on a user selected criteria from at least one of a social networking relationship, or an activity;
- receiving an update to the integrated live view; and
- reorganizing the updated integrated live view based on the user selected criteria.

20. The method of claim 17, wherein generating an integrated live view further comprises:
- providing an integrated live contact list that comprises at least one of an online network status, a mood, an avatar, a photograph, a message count, a social networking relationship identifier, a text message, or information associated with a blog for at least one contact with the integrated live contact list.

* * * * *